US006380291B1

(12) United States Patent
von Hellens

(10) Patent No.: US 6,380,291 B1
(45) Date of Patent: Apr. 30, 2002

(54) RUBBER COMPOSITIONS AND METHOD OF MAKING THEM

(75) Inventor: Carl Walter von Hellens, Bright's Grove (CA)

(73) Assignee: Bayer Inc., Sarnia (CA)

( * ) Notice: Subject to any disclaimer, the term of this patent is extended or adjusted under 35 U.S.C. 154(b) by 0 days.

(21) Appl. No.: 09/407,512

(22) Filed: Sep. 28, 1999

(30) Foreign Application Priority Data

Oct. 5, 1998 (CA) ............................................ 2249193

(51) Int. Cl.[7] .............................. C08K 5/10; C08F 8/08

(52) U.S. Cl. ....................... 524/313; 524/366; 524/378; 525/107; 525/274; 525/303

(58) Field of Search .......................... 525/65, 107, 303, 525/304, 305, 274; 524/313, 366, 378

(56) References Cited

U.S. PATENT DOCUMENTS 5,830,946 A * 11/1998 Ozawa et al. ................. 525/65

* cited by examiner

*Primary Examiner*—David W. Wu
*Assistant Examiner*—R. Harlan
(74) *Attorney, Agent, or Firm*—Joseph C. Gil; Noland J. Cheung

(57) ABSTRACT

Rubber compositions comprising an acrylate or methacrylate salt, an elastomer curable with a peroxide initiator and a plasticizer having one or more epoxide groups per molecule display lower compound Mooney viscosity, higher MH/modulus, increased hardness and improved odour.

14 Claims, 8 Drawing Sheets

2-PROPENOIC ACID
6.37
SOLVENTS
ACETIC ACID
4.04
Abundance
6000000
5500000
5000000
4500000
4000000
3500000
3000000
2500000
2000000
1500000
1000000
500000
Time---->
1.00
2.00
3.00
4.00
5.00
6.00
7.00
8.00
9.00
10.00

100% Modulus (MPa)
10.0
9.5
9.0
8.5
8.0
7.5
7.0
6.5
6.0
5.5
5.0
7.9
8.6
9.8
8.1
6.9
8.2
7.2
NONE 0
ESBO 5
ESBO 10
TOTM 5
TOTM 10
G31 5
G31 10

Mh (dN.m)
90.00
85.00
80.00
75.00
70.00
65.00
88.78
85.76
87.64
76.79
67.21
78.10
73.83
NONE 0
ESBO 5
ESBO 10
TOTM 5
TOTM 10
G31 5
G31 10

Hardness (°A)
80
78
76
74
72
70
68
76
77
79
74
73
73
73
None 0
ESBO 5
ESBO 10
TOTM 5
TOTM 10
G31 5
G31 10

RUBBER COMPOSITIONS AND METHOD OF MAKING THEM

FIELD OF THE INVENTION

The present invention relates to a (meth)acrylate metal salt-containing rubber composition comprising a plasticiser having one or more epoxide groups per molecule.

BACKGROUND OF THE INVENTION

Acrylate or methacrylate metal salts are added to rubber compositions prior to curing to impart to the cured product qualities such as increased stiffness, hardness and abrasion resistance. Acrylate or methacrylate metal salts are used in compositions with any elastomer that can be polymerized with a peroxide initiator. The acrylate or methacrylate salt presumably participates in cross-linking of the elastomer during curing, and also is believed to form a poly-metal-acrylate or poly-metal-methacrylate matrix throughout the rubber. The most commonly used salts are zinc diacrylate and zinc dimethacrylate. Cured rubber compositions comprising acrylate or methacrylate metal salts are suitable for use in applications where a particularly stiff and abrasion resistant rubber is required. Typical end uses include conveyor belts, shoe bottoms, hard roll covers and golf balls. For use in conveyor belts, a typical rubber composition comprises hydrogenated acrylonitrile-butadiene rubber (NBR) as the main elastomer component, zinc diacrylate, and a plasticizer. A typical composition for golf balls comprises polybutadiene as the elastomer and zinc diacrylate.

Rubber compositions formulated with acrylate and methacrylate metal salts suffer the considerable drawback of emitting an offensive odour during processing. The odour can be offensive enough to make processing extremely unpleasant, at best. Some processing companies have reported that processing of this kind of composition is impossible without the introduction of special ventilating means. The intensity of the odour increases when the composition is heated, but is detectable at ambient temperatures. The odour has also been observed to be more severe when a rubber composition containing an acrylate or methacrylate metal salt is stored for long periods (typical storage may be for as long as two years). It would be of significant value to find a means for reducing or eliminating the odour emitted from acrylate and methacrylate metal salt-containing compositions.

Plasticisers, or softeners, are compounds which are added to rubber compositions to improve processing characteristics, and often to produce a finished product with altered characteristics. Plasticisers are usually organic compounds that act as high boiling solvents for the elastomer component of the rubber composition. When added to an elastomer, they soften the resulting composition. In a rubber composition, softening is reflected by a decreased Mooney viscosity. This leads to greater ease of mixing, and improvement of other processing characteristics (for example, ease of shaping, moulding, blowing, etc.). When cured, rubber compositions containing plasticisers usually have a decreased modulus and a decreased hardness relative to the analogous cured composition without plasticiser. In rubber compositions destined for end uses that require a high modulus or a high degree of hardness, the addition of a conventional plasticisers to the rubber composition is therefore detrimental. As mentioned above, rubber compositions which contain no plasticiser are usually extremely difficult to process. A plasticiser which confers a balance of good processing characteristics and high modulus and high degree of hardness in the cured product is highly desirable.

SUMMARY OF THE INVENTION

In one aspect the invention provides a curable rubber composition comprising an acrylate or methacrylate metal salt, an elastomer that is curable with a peroxide initiator, and a plasticizer having one or more epoxide groups per molecule.

In another aspect, the invention provides a cured rubber composition prepared by adding a peroxide initiator to a curable rubber composition of the invention and heating the resulting mixture to a temperature sufficient to cure the composition.

In another aspect, the invention provides a process for preparing a curable rubber composition, the process comprising compounding an acrylate or methacrylate metal salt, an elastomer that is curable with a peroxide initiator, and a plasticizer having one or more epoxide groups per molecule.

In yet another aspect, the invention provides a process for preparing a cured rubber composition, the process comprising adding a peroxide initiator to a curable rubber composition of the invention, and heating the resulting mixture to a temperature sufficient to cure the composition. BRIEF DESCRIPTION OF THE DRAWINGS FIG. 1 shows a gas-chromatography-mass-spectrometry (GCMS) trace for a sample containing the gaseous emissions from a composition of the prior art, when the composition is heated to 150° C.;

DETAILED DESCRIPTION OF PREFERRED EMBODIMENTS

Figure 1:
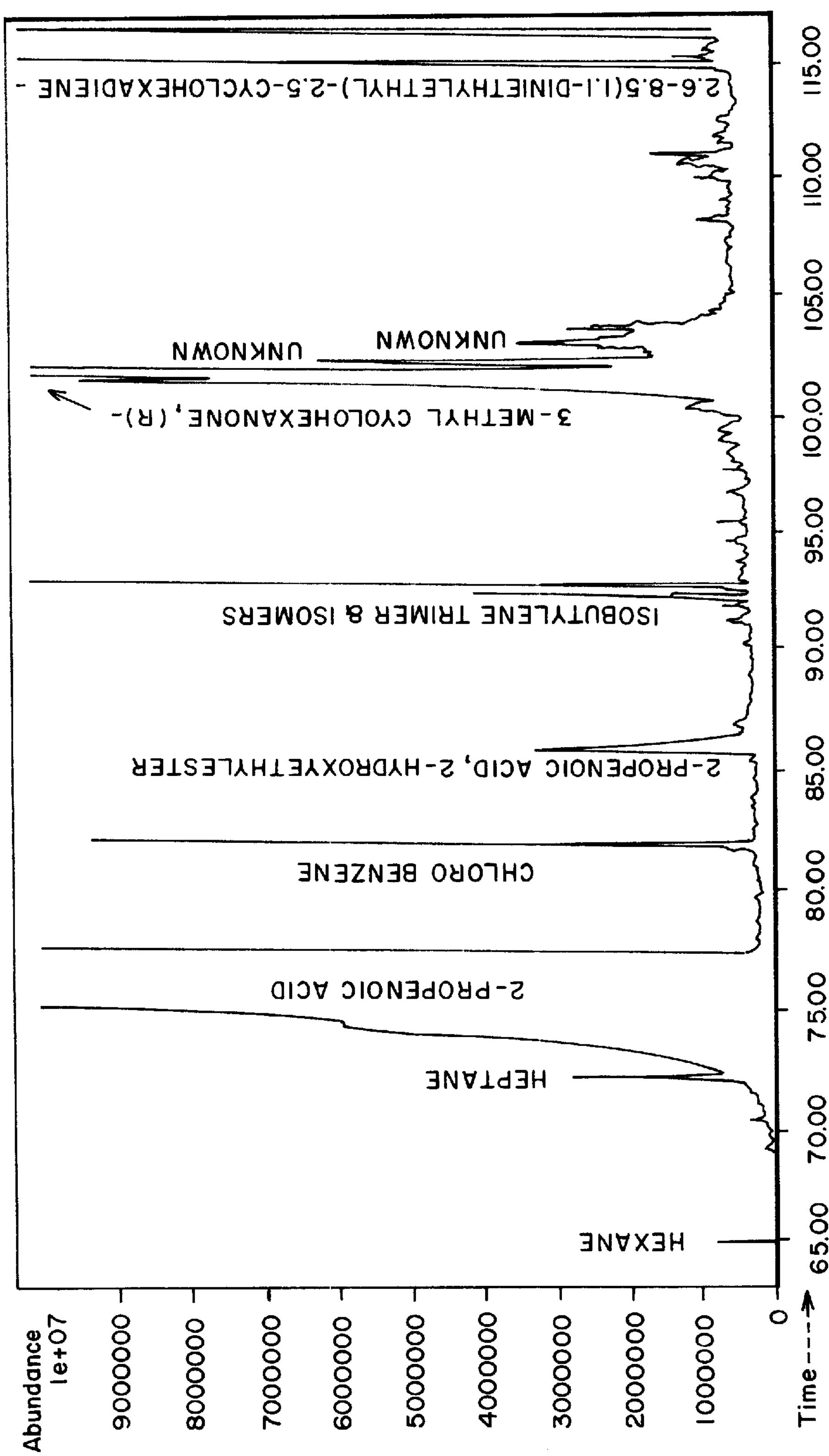

The inventor has found that the use of plasticisers with one or more epoxide groups in the molecule in an acrylate metal salt-containing rubber composition, in which the elastomer component is curable with a peroxide initiator, results in a composition with improved processing characteristics, while surprisingly yielding a cured product with a high modulus and a high degree of hardness. Another advantage of some of the rubber compositions of the invention is that they are substantially free of acrylate or methacrylate odour. Yet another advantage of the rubber compositions of the invention is their significantly reduced Mooney viscosity.

In common parlance of rubber technology, the stress required to cause a given elongation in a rubber composition is used as a quantifier for the stiffness of the composition. This quantity is called the modulus. A 300% modulus, for example, means the stress required to produce a 300% elongation. Stress is defined as the force per unit cross-sectional area, i.e. F/A for tensile deformations. Strain is defined as the deformation per unit original length ($\Delta L/L_0$) in tensile tests. Stress is usually expressed in MegaPascals (MPa). Strain is a ratio and is often expressed as a percentage. Since it is obtained from the ratio of two lengths, it is dimensionless. An elongation of 300%, for example, means that the specimen has been stretched to four times its original length (Rubber Technology, 3rd edition, Maurice Morton, Ed., Chapman & Hall, London). The modulus is usually measured in accordance with procedures defined in ASTM D412.

The abbreviation "phr" is used throughout this specification to indicate "parts per hundred parts rubber". In this context, "rubber" means the elastomer or elastomers used in the composition.

Rubber compositions formulated with conventional plasticisers typically cure to yield a cured rubber composition in which the modulus is decreased relative to an analogous composition prepared without plasticiser. The degree of the decrease in modulus is of course related to the types of elastomer and plasticiser used, and the amount of plasticiser added. For end uses in which a relatively stiff cured product is required, it is desirable that the cured product have a 100% modulus of at least about 2.0 MPa. It is preferred that the 100% modulus be at least about 5.0 MPa, and particularly preferred that it be at least about 13 MPa. High modulus cured rubber compositions formulated with acrylate or methacrylate metal salts are particularly suited for end uses requiring a rubber with a high degree of stiffness and resistance to wear and abrasion. Typical end uses include the preparation of conveyor belts, hard roll covers, and golf balls.

The Mooney viscosity of a rubber composition reflects the ease with which the composition can be processed. Compositions without plasticisers show elevated Mooney viscosities, making the incorporation of additives, moulding, shaping and other processing steps extremely difficult. In the absence of plasticisers, a zinc diacrylate containing composition can be expected to have a Mooney viscosity in the order of about 40 to about 50 Mooney units (ML 1+4 @ 100° C.). For ease of processing, it is preferred that a composition have a Mooney viscosity of less than about 30 Mooney units, more preferable less than about 25 Mooney units.

The plasticiser having at least one epoxide group that is used in the composition of the invention preferably has a molecular weight of at least 250. It is rare to use an epoxidized plasticiser with a molecular weight of greater than 3000. The plasticiser should have a solubility parameter similar to that of the principle elastomer in the composition. The solubility parameter reflects the relative miscibility or solubility of two compounds with one another. It is preferred that the plasticiser have two or more epoxide groups, and particularly preferred that it have three epoxide groups. Also suitable are those with four or more epoxide groups. Suitable plasticisers comprising molecules having at least one epoxide group are epoxidized esters, for example epoxidized triacyl glycerols, particularly tri($C_4$–$C_{30}$)acyl glycerols, alkyl epoxy stearates, alkyl epoxy tallates (such as octyl epoxy tallates), and di(alkyl)4,5-epoxytetra-hydrophthalate (such as di(decyl)4,5-epoxytetra-hydrophthalate). Also suitable are epoxidized fatty acids and fatty alcohols, particularly acids and alcohols with about 20 to about 30 carbon atoms. Preferred are epoxidized plant and animal fats and oils, particularly epoxidized vegetable oils, for example, those selected from the group consisting of, epoxidized linseed oil, epoxidized peanut oil, epoxidized rapeseed oil, epoxidized sunflower oil and epoxidized soybean oil. Most preferred is epoxidized soybean oil (ESBO). Soybean oil comprises triglycerides of oleic, linoleic, linolenic and saturated fatty acids. When epoxidized, it contains, on average, 3 epoxide groups per molecule.

The plasticiser having at least one epoxide group per molecule can be used with other plasticisers that are compatible with the rubber composition and the end use of the cured rubber composition. It is preferred that the plasticizer comprising molecules having at least one epoxide group represent at least 50% of the total plasticiser used. It is particularly preferred that the plasticiser having one or more epoxide groups represent at least 75% of the total plasticiser.

The total plasticizer should be present in the rubber composition in an amount of from about 2 to about 20 phr. Preferably, it is present at about 4 to about 18 phr, particularly preferably, it is present in a amount of from about 6 to about 16 phr, more particularly preferably, it is present in an amount of about 8 to about 14 phr.

The acrylate or methacrylate metal salt to be used in the compositions of the invention is preferably a salt with a divalent metal. Mention is made of the diacrylates and dimethacrylates of Mg, Ca, Ba and Zn. Particularly preferred are zinc diacrylate and zinc dimethacrylate. Mixtures of any of these salts can also be used. Most preferred is zinc diacrylate.

The acrylate or methacrylate metal salt should be present in the rubber composition at an amount of from about 10 to about 100 phr. Preferably it is present in an amount of from about 20 to about 90 phr, particularly preferably in an amount of from about 30 to about 80 phr.

The elastomer to be used in the compositions of the invention can be any elastomer that can be cured with a peroxide initiator. Suitable elastomers include natural rubber (NR), styrene-butadiene rubber (SBR), acrylonitrile-butadiene rubber (NBR), hydrogenated acrylonitrile-butadiene rubber (HNBR), polybutadiene rubber (BR), polyisoprene rubber (IR), ethylene-propylene rubber, halobutyl rubber (XIIR), polyacrylic rubber, neoprene rubber, silicone rubber, ethylene vinyl acetate rubber (EAM) and fluorocarbon rubber. Mixtures of any of these can also be used. Preferred for use in the manufacture of golf balls is polybutadiene rubber. Preferred for the manufacture of conveyor belts is acrylonitrile-butadiene rubber, and particularly preferred for this use is hydrogenated acrylonitrile-butadiene rubber, for example available under the trademark Therban C3467.

The rubber compositions of the invention may be cured by adding a peroxide initiator and heating to a suitable temperature. The choice of peroxide initiator depends on the particular elastomer used. Suitable initiators include isobutyryl peroxide, acetyl cyclohexyl sulfonyl peroxide, di(2-ethylhexyl)peroxydicarbonate, di(sec-butyl)peroxydicarbonate, diisopropyl peroxydicarbonate, 2,4-dichlorobenzoyl peroxide, t-butyl peroxypivalate, 1,1,3,3-tetramethylbutylperoxy-2-ethylhexanoate, decanoyl peroxide, lauroyl peroxide, 2,5-dimethyl-2,5-bis(2-ethylhexanoylperoxy)hexane, t-butyl peroctoate, benzoyl peroxide, t-butyl peroxybutyrate, t-butylperoxy isopropyl carbonate, 2,5-dimethyl-2,5-bis(t-butylperoxy)hexane, di-t-butyl peroxide, 2,5-dimethyl-2,5-bis(t-butylperoxy)-3-hexyne, 2,4-pentanedione peroxide, t-butyl hydroperoxide, and $\alpha,\alpha'$-bis(t-butylperoxy)diisopropyl benzene (VULCUP 40KE). Particularly preferred is $\alpha,\alpha'$-bis(t-butylperoxy)diisopropyl benzene.

The peroxide initiator is preferably added to the rubber composition in an amount of from about 0.5 to about 12 phr, particularly preferably from about 1 to about 8 phr, more particularly preferably from about 4 to about 7 phr. The rubber composition of the invention may additionally contain other additives, for example, accelerators, accelerator activators, antioxidants, antiozonants, fillers, retarders, colours, blowing aids, abrasives, dusting agents, odourants, and homogenizing agents. It is sometimes desirable to add compounds to the rubber composition of the invention which modify the rate of cure, for example (2,6-di-t-butyl-4-(dimethylamino)methyl)-phenol (Ethanox 703). The compound which modifies the rate of cure may be added to the rubber composition in an amount of about 0.5 to about 5 phr, preferably about 1 to about 3 phr, particularly preferably about 2 phr.

The curable rubber composition of the invention can be compounded using methods known in the art. Preferred methods involve the use of either a mill or Banbury mixer.

The curable rubber compositions of the invention preferably have a Mooney viscosity of less than about 30 Mooney units, more preferably less than about 25 Mooney units.

The rubber compositions of the invention can be further processed, before, during or after curing, for example by moulding, calendering, extruding, or fabricated into a composite item (such as a tire, a conveyor belt, shoe sole).

The curing temperature for the compositions of the invention is chosen taking into consideration such things as the dimensions of the object to be cured, the thermal stability of the elastomer, the decomposition temperature of the peroxide, the geometry of a mould (if used), and the curing characteristics of the composition. Examples of curing techniques that can be used to cure the rubber composition of the invention include compression moulding, transfer moulding, injection moulding, open cures (for example open steam cures, water cures), liquid cures, fluidized bed cures, microwave cures, and the Rotacure process. The Rotacure process is particularly suitable for the preparation of conveyor belts. Suitable curing temperatures are from about 140° to 230° C. Particularly preferred is a temperature range of about 150° to about 180° C. In some instances, for example hard roll covers for papermaking machinery, the cure takes place at a lower temperature, perhaps 100° C. or higher, and over an extended period of time, for instance 16 to 24 hours.

The cured rubber compositions of the invention preferably have a 100% modulus (dumbbell test) of from about 2.0 MPa to about 5.0 MPa, more preferably from about 5.0 MPa to about 15.0 MPa, particularly preferably from about 10.0 MPa to about 15.0 MPa.

The invention is further illustrated by the following drawings and examples, which are intended in no way to limit it.

EXAMPLE 1

(Comparative)

Preparation of a Control Rubber Composition using the Conventional Plasticiser Paraplex G31

A rubber composition (referred to in Table 1 as 423 or "control") was formed from the following ingredients:

100 parts Therban C3467 (hydrogenated acrylonitrile-butadiene rubber, with a 34% (weight %) acrylonitrile content, 5% of the double bonds in the elastomer backbone remaining);

40 parts Sartomer SR633 (zinc diacrylate) (Sartomer SR633 is a blend of a major part of zinc diacrylate and a minor part of Ethanox 703);

10 parts Paraplex G31 (dibasic acid polyester plasticiser).

Figure 2:
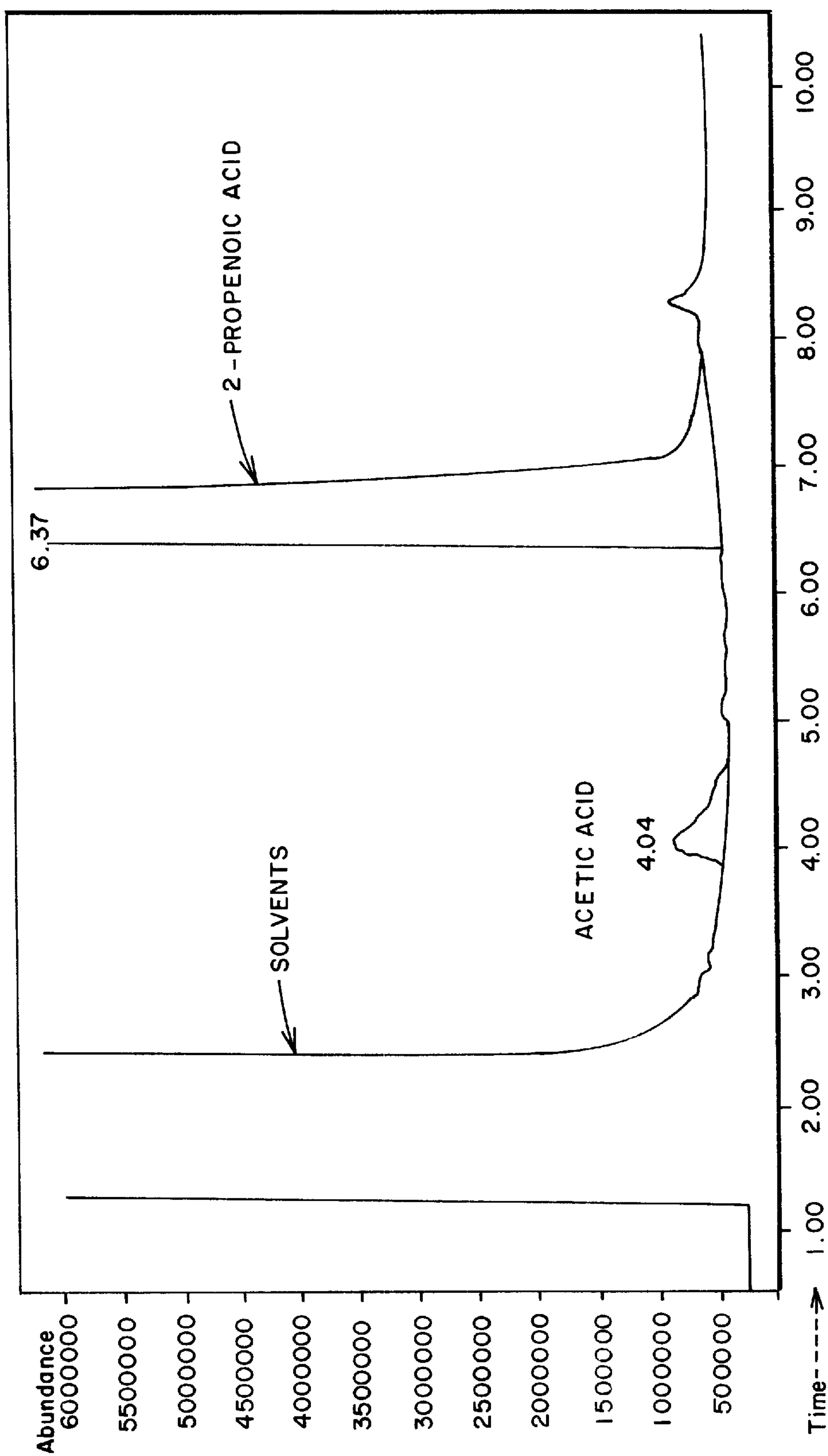
FIG. 2 shows an expanded portion of the GCMS trace of FIG. 1.

The rubber composition was compounded using the protocol outlined in Table 1. This kind of rubber composition is used for conveyor belts. Similar compositions can be formulated using 80 phr of zinc diacrylate. The above rubber composition had a pronounced "vinegar-like" odour, which increased in severity as the composition was stored. High temperatures (for example 150° C.) increased the severity of the odour. A GCMS was run on the gases evolved from the composition when it was heated to 150° C. The results are shown in FIGS. 1 and 2. The main constituent evolved is acrylic acid, with a slight amount of acetic acid (less than 5 parts per hundred parts of acrylic acid).

The control rubber composition was cured using 6 phr of VULCUP 40KE as initiator.

The physical parameters of the control curable rubber composition 423 and its cured product were evaluated and the results are listed in Table 2, below.

EXAMPLE 2

(According to the Invention)

Preparation of a Rubber Composition using Epoxidized Soybean Oil (ESBO, Paraplex G62) as Plasticiser A rubber composition (referred to in Table 1 as 426 or "ESBO") was formulated in the same way as the control, with the exception that the plasticiser was epoxidized soybean oil (ESBO), as follows:

100 parts Therban C3467 (hydrogenated acrylonitrile-butadiene rubber, with a 34% (weight %) acrylonitrile content, 5% of the double bonds in the elastomer backbone remaining);

40 parts Sartomer SR633 (zinc diacrylate);

10 parts ESBO (Paraplex G62).

The ESBO-containing rubber composition was compounded using the protocol outlined in Table 1. The ESBO-containing composition had substantially no "vinegar-like" odour.

The ESBO-containing rubber composition was cured using 6 phr of VULCUP 40KE as initiator.

The physical parameters of the ESBO-containing curable rubber composition 426 and its cured product were evaluated and the results are listed in Table 2. As can be seen, the cured ESBO-containing rubber composition 426 showed a large increase in maximum torque (as measured by the MDR), in comparison with the control composition 423. The cured ESBO-containing rubber composition showed a much higher modulus and hardness than the control.

EXAMPLE 3

Curable rubber compositions were prepared in which Paraplex G31 plasticiser was replaced with differing amounts of ESBO plasticiser, the total amount of plasticizer remaining constant. The formulations and mixing protocol are listed in Table 3. The curable rubber compositions and their cured counterparts were tested and the results are listed in Table 4.

Figure 3:
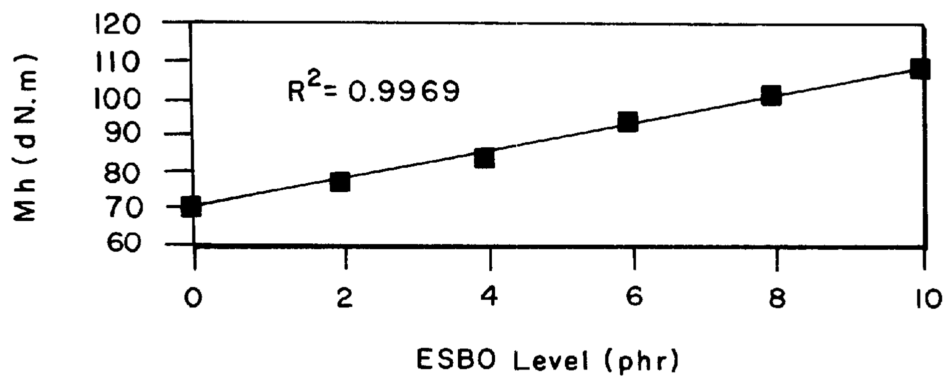
FIG. 3 shows the maximum torque, as measured by a moving die rheometer (MDR), plotted against epoxidized soybean oil content in a zinc diacrylate/hydrogenated acrylonitrile-butadiene/peroxide composition of the invention.

The MDR maximum torque for the cured compositions were plotted against the ESBO level. The results are shown in FIG. 3. The maximum torque increased markedly as the Paraplex G31 was replaced with ESBO. Despite the very significant change in MDR torque levels there was no significant change in the cure time parameters as the ESBO level increased.

Figure 4:
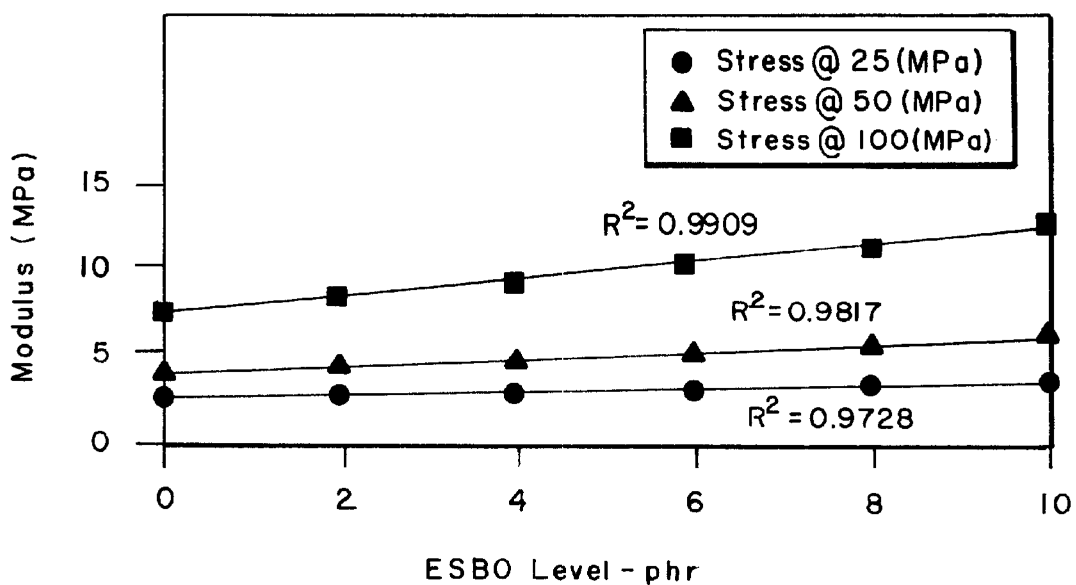
FIG. 4 shows the 25, 50 and 100% modulus plotted against epoxidized soybean oil content in cured rubber compositions of the invention.

The modulus was plotted against the ESBO level. The results are shown in FIG. 4. The modulus increased significantly as the Paraplex G31 is replaced with ESBO.

The other trend seen as the Paraplex G31 is replaced with ESBO is an increase in hardness In summary the ESBO-containing rubber compositions of this example show:

(1) lower compound Mooney viscosity;

(2) much higher MH/modulus;

(3) increase in hardness;

(4) little or no "vinegar-like" odour.

EXAMPLE 4

Zinc diacrylate containing rubber compositions were formulated using Therban 3467 as the elastomer, and various plasticisers at different levels. Compositions 282 and 284, in Table 5, contained ESBO at 5 and 10 phr. For comparison, control rubber compositions were formulated to contain no plasticiser (composition 282, in Table 5), trioctyl trimellitate (TOTM) plasticiser at 5 and 10 phr (compositions 285 and 286, in table 5), and Paraplex G31 at 5 and 10 phr (compositions 287 and 288, in Table 5).

The compositions were compounded using the protocol outlined in Table 5. The physical characteristics of the rubber compositions and their cured counterparts are listed in Table 6.

The results are represented in "bar chart" format in FIGS. 5 to 9.

Figure 5:
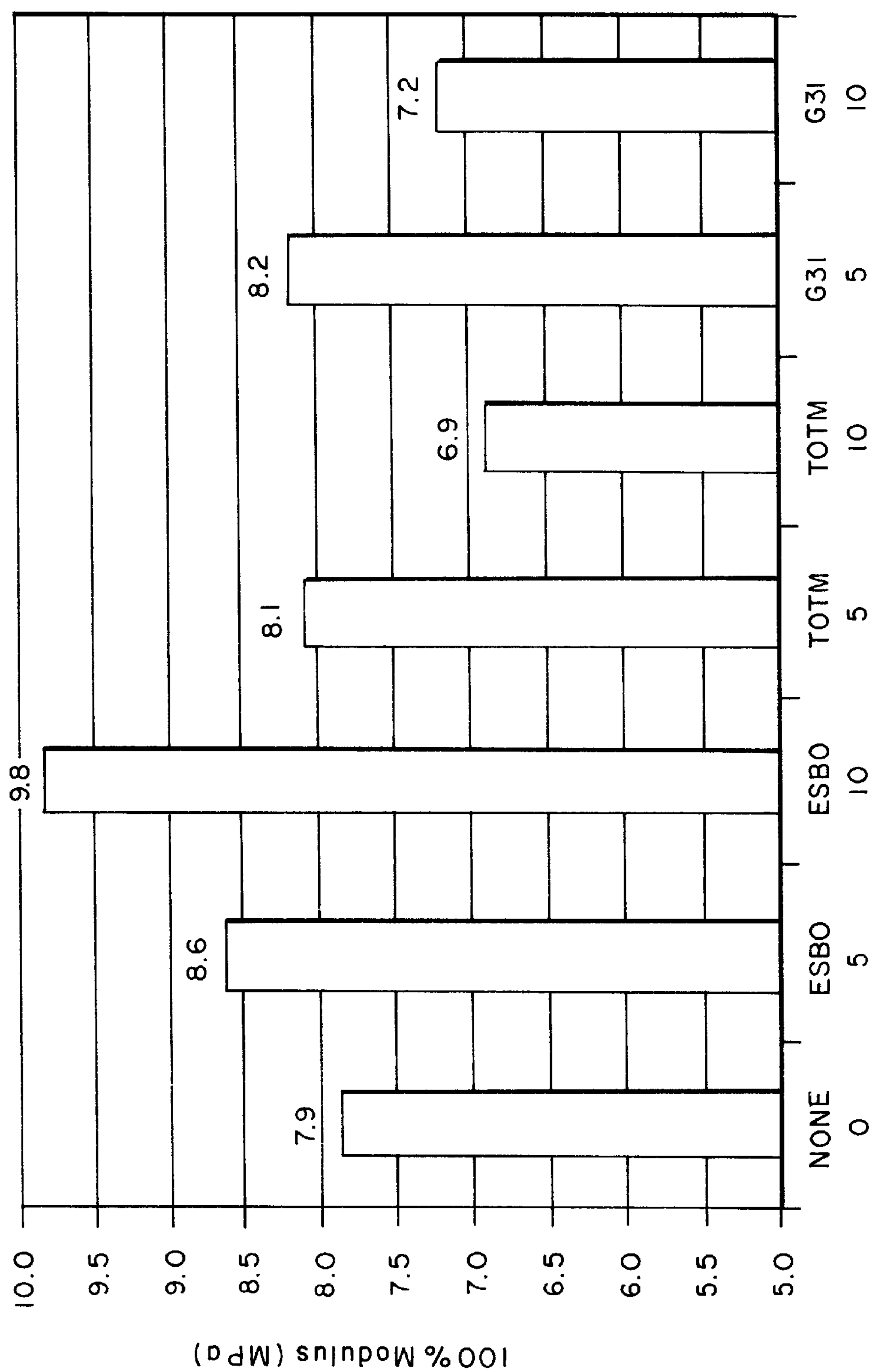
FIG. 5 shows in bar chart format the 100% modulus for cured rubber compositions containing various plasticisers.

FIG. 5 shows that the cured composition with ESBO as plasticiser at 5 phr shows a larger 100% modulus (8.6 MPa) than all the non-ESBO-containing compositions. The cured composition with ESBO as plasticiser at 10 phr shows by far the largest 100% modulus (9.8 MPa), and shows that ESBO demonstrates a reverse of the trend observed with the other plasticisers, in that modulus increases as plasticiser level increases from 5 to 10 phr.

Figure 6:
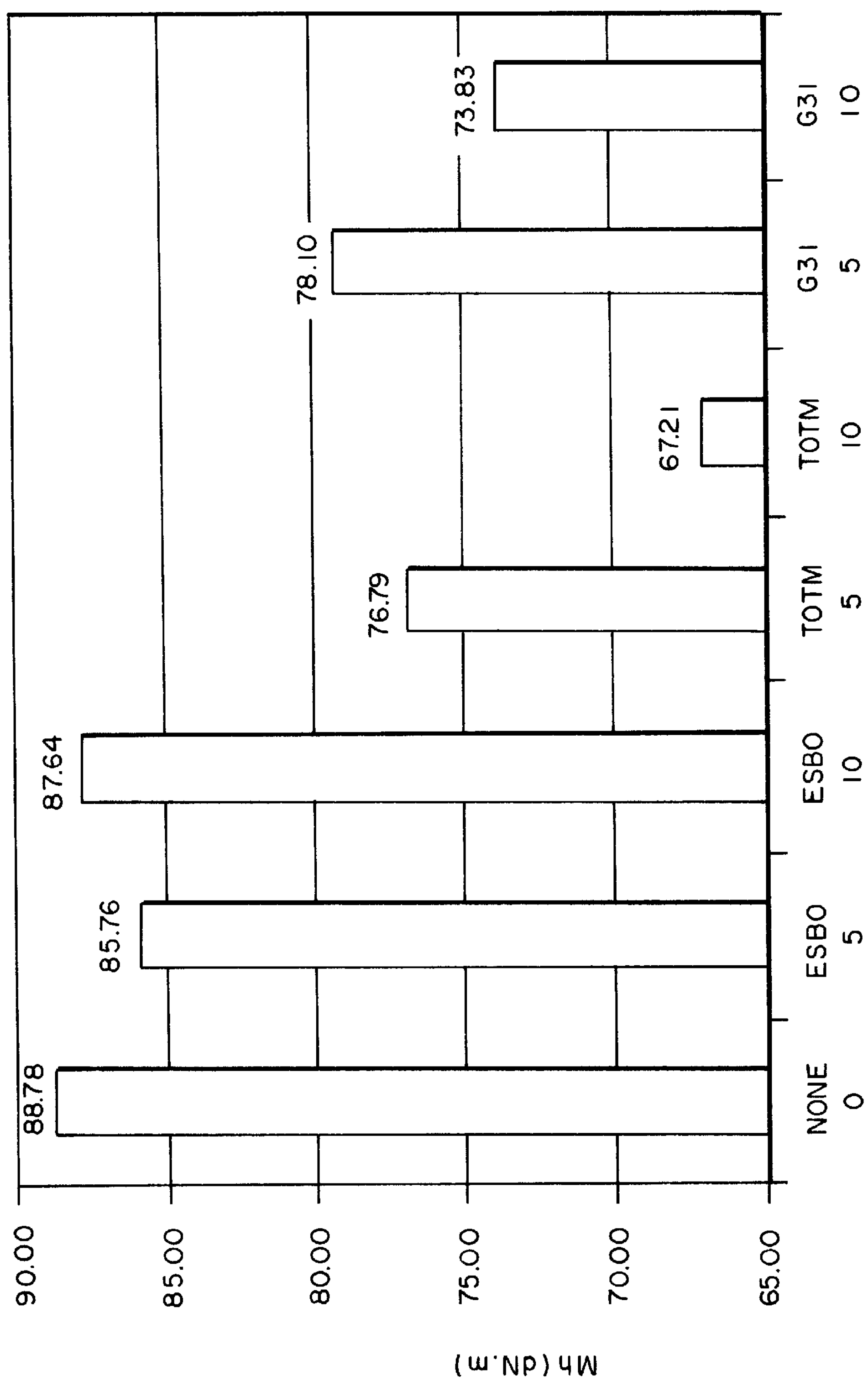
FIG. 6 shows maximum torque as measured by the moving die rheometer (MDR) for cured rubber compositions containing various plasticisers.

FIG. 6 shows that the ESBO containing compositions show very high maximum torque, as measured by the moving die rheometer (MDR). The maximum torque increases as ESBO content increases from 5 to 10 phr.

Figure 7:
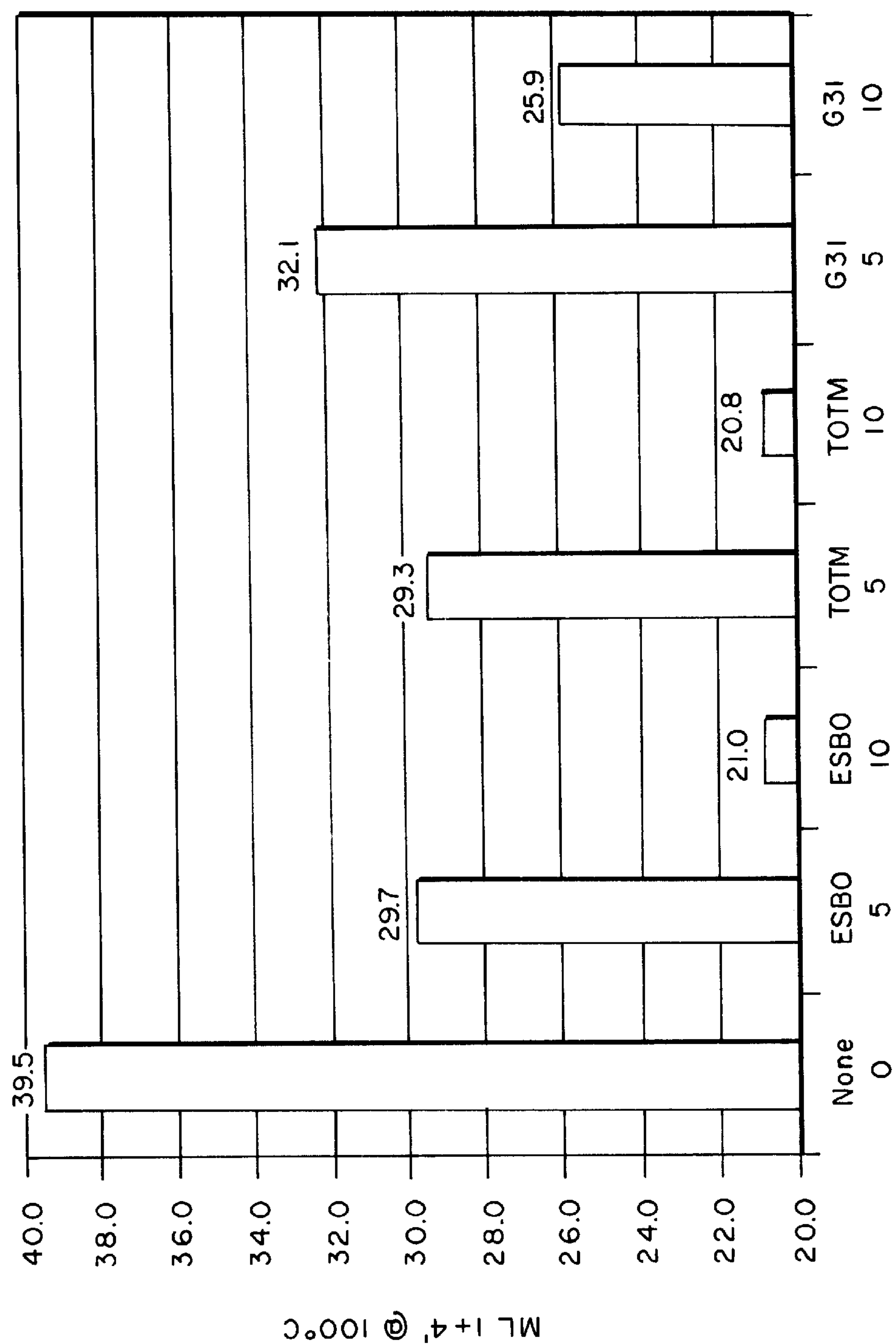
FIG. 7 shows the composition Mooney viscosity for rubber compositions containing various plasticisers.

FIG. 7 shows that the rubber composition Mooney viscosity is significantly reduced in the ESBO-containing compositions. Low Mooney viscosity results in greater ease of processing. The ESBO shows the greatest degree of plasticising (softening), at 10 phr, of any of the plasticisers tested.

Figure 8:
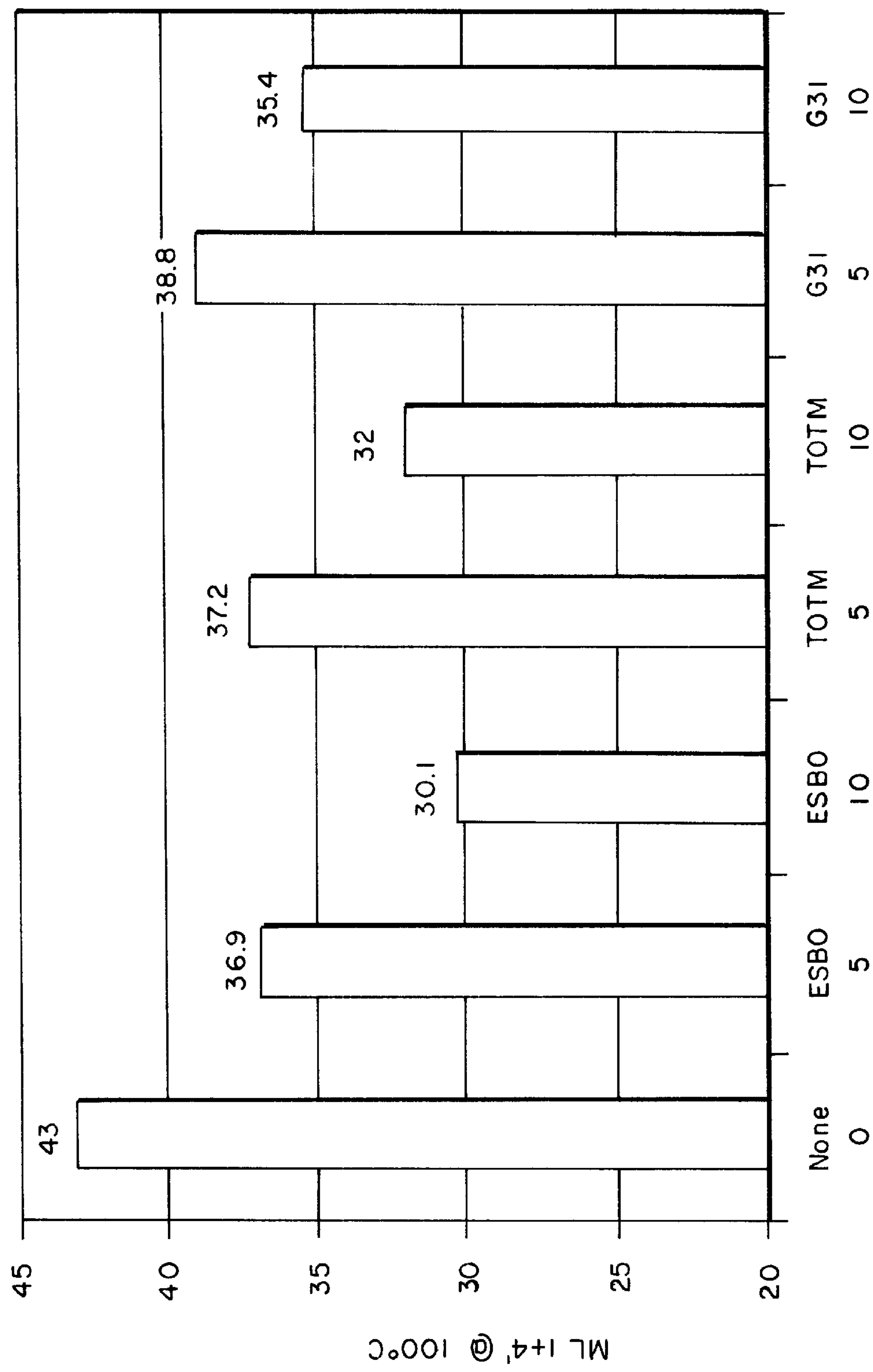
FIG. 8 shows the compound Mooney viscosity for rubber compositions containing various plasticisers.

FIG. 8 shows the compound Mooney viscosity for the compositions.

Figure 9:
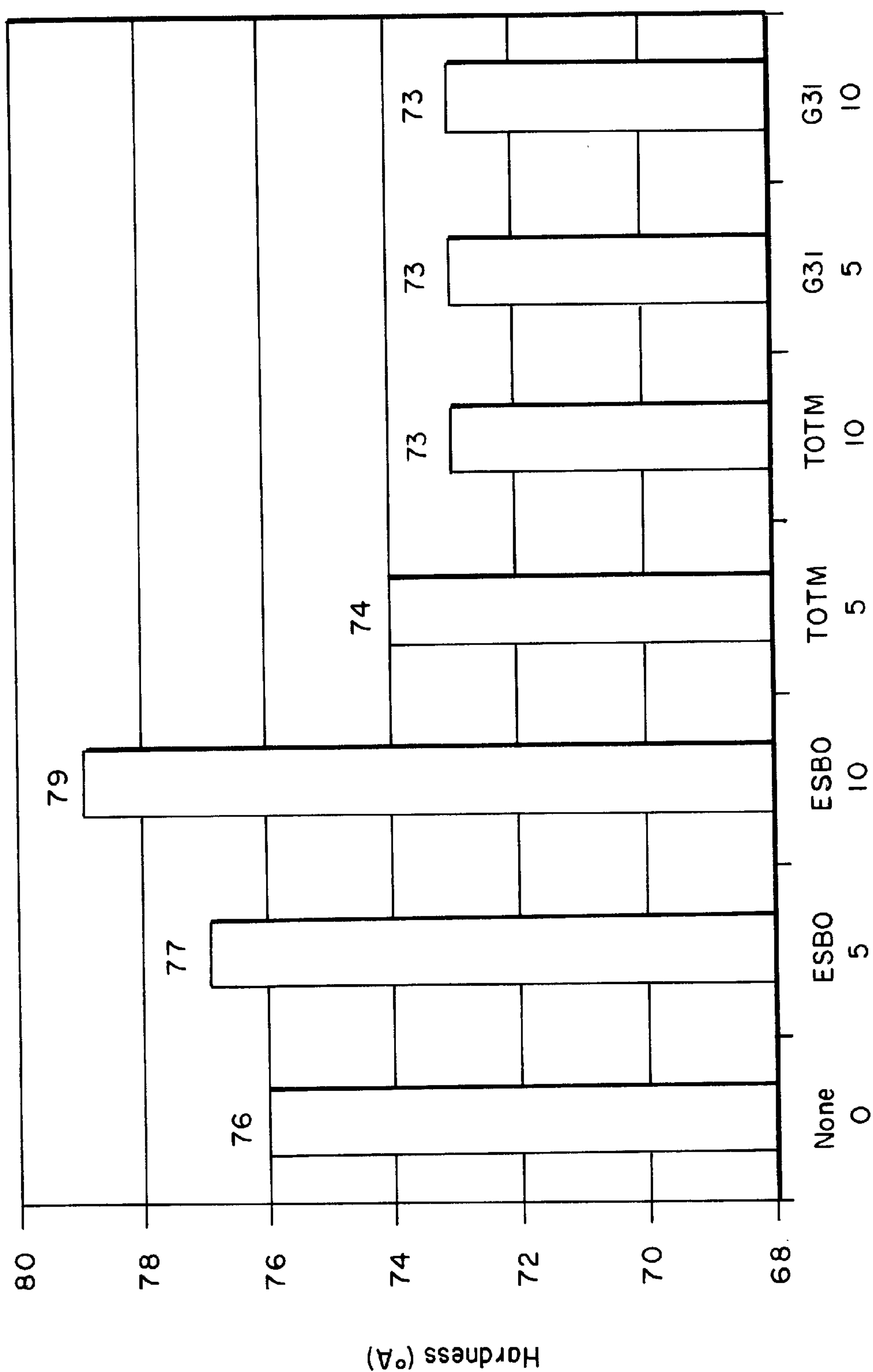
FIG. 9 shows the hardness for cured rubber compositions containing various plasticisers.

FIG. 9 shows that the ESBO-containing compositions exhibit the greatest hardness of the compositions tested. Hardness increases as the ESBO content is increased from 5 to 10 phr.

TABLE 1

| | Variable | 423 Control Paraplex G31 | 426 ESBO Paraplex G62 |
|---|---|---|---|
| THERBAN C3467 | 1A | 50 | 50 |
| PARAPLEX G-31 | 1B | 10 | |
| PARAPLEX G-32 (ESBO) | 1B | | 10 |
| SARTOMER 633 (SR633) | 1B | 40 | 40 |
| THERBAN C3467 | 2A | 50 | 50 |
| VULCUP 40KE | 2B | 6 | 6 |
| | Total | 156 | 156 |
| Specific Gravity | | 1.086 | 1.079 |

MIXER: 6×12 inch Mill (Capacity: 1000 g)
Set mill Mokon to 30° C.

Mixing Instructions

Stage I

0'—BAND RUBBER "1A"

2'—SLOWLY ADD "1B"; MAKE ¾ CUTS

8'—REMOVE AND THEN REFINE (6 PASSES)

Stage II

0'—BAND COMPOUND FROM STAGE I AND THEN MILL IN "2A"; MAKE ¾ CUTS.

4'—ADD "2B"; MAKE ¾ CUTS.

TABLE 2

| | 423 Control Paraplex G31 | 426 ESBO Paraplex G62 |
|---|---|---|
| COMPOUND MOONEY VISCOSITY | | |
| ML1 + 4' @ 100° C. (mu) | 34.1 | 34.7 |
| COMPOUND MOONEY SCORCH | | |
| Rotor size: large | >30 | >30 |
| t5 @ 125° C. (min) | | |
| Rotor Size: small | 21.6 | 17.4 |
| t5 @ 135° C. (min) | | |
| MDR CURE CHARACTERISTICS | | |
| Frequency: 1.7 Hz | | |
| 160° C.; 1° arc; 100 range; | | |
| 60' motor | | |
| MH (dN · m) | 74.82 | 103.17 |
| ML (dN · m) | 0.97 | 1.07 |
| MH - ML (dN · m) | 73.85 | 102.10 |
| ts 1 (min) | 1.07 | 0.91 |
| t' 10 (min) | 2.11 | 1.98 |
| t' 50 (min) | 5.72 | 5.70 |
| t' 90 (min) | 23.61 | 23.47 |
| t'50 - t'10 (min) | 3.61 | 3.72 |
| STRESS STRAIN (DUMBBELLS) | | |
| Cure Time: 40' @ 160° C. | | |
| Stress @ 25 (MPa) | 2.4 | 3.5 |
| Stress @ 50 (MPa) | 4.1 | 6.2 |
| Stress @ 100 (MPa) | 7.8 | 12.0 |
| Stress @ 200 (MPa) | 19.3 | 27.1 |
| Stress @ 300 (MPa) | | |
| Ultimate Tensile (MPa) | 30.4 | 30.6 |
| Ultimate Elongation (%) | 265 | 225 |
| Hard. Shore A2 Inst. (pts.) | 78 | 82 |
| COMPRESSION SET - METHOD B | | |
| Cure Time: 40' @ 160° C. | | |
| Aged 70 h @ 100° C. | | |
| Compression Set (%) | 32 | 36 |

TABLE 3

| | Composition | 33 | 34 | 35 | 36 | 37 | 38 |
|---|---|---|---|---|---|---|---|
| | Paraplex G31 | 10 | 8 | 6 | 4 | 2 | 0 |
| | ESBO | 0 | 2 | 4 | 6 | 8 | 10 |
| THERBAN C3467 | 1A | 100 | 100 | 100 | 100 | 100 | 100 |
| PARAPLEX G-31 (polyester) | 1B | 10 | 8 | 6 | 4 | 2 | 0 |
| ESBO | 1B | 0 | 2 | 4 | 6 | 8 | 10 |
| SARTOMER 633 (SR633) | 1B | 40 | 40 | 40 | 40 | 40 | 40 |
| VULCUP 40KE | 1C | 6 | 6 | 6 | 6 | 6 | 6 |
| Specific Gravity | | 1.086 | 1.084 | 1.083 | 1.082 | 1.08 | 1.079 |

MIXER: 6×12 inch Mill (Capacity:1000)
Set Mill Mokon @ 30° C.
Mixing Instructions
0'—BAND RUBBER "1A"
2'—SLOWLY ADD "1B" (alternately add powder then oil); MAKE ¾ CUTS
8'—SLOWLY ADD "1C"; MAKE ¾ CUTS
11'—REMOVE and REFINE ON WARM MILL (6 passes)

TABLE 4

| Composition | 33 | 34 | 35 | 36 | 37 | 38 |
|---|---|---|---|---|---|---|
| Paraplex G31 | 10 | 8 | 6 | 4 | 2 | 0 |
| ESBO | 0 | 2 | 4 | 6 | 8 | 10 |
| COMPOUND MOONEY VISCOSITY | | | | | | |
| ML 1 + 4' @ 100° C. (mu) | 39.4 | 39.1 | 38.3 | 38.1 | 37.2 | 36.4 |
| COMPOUND MOONEY SCORCH | | | | | | |
| Large Rotor t5 @ 125° C. (min) | >30 | >30 | >30 | >30 | >30 | >30 |
| Large Rotor t5 @ 135° C. (min) | 15.1 | 15.4 | 15.3 | 14.3 | 14.6 | 14.1 |
| MDR CURE CHARACTERISTICS Frequency: 1.7 Hz 1° arc; 160° C., 60' motor | | | | | | |
| MH (dN.m) | 71.78 | 78.08 | 85.50 | 95.08 | 102.60 | 109.38 |
| ML (dN.m) | 1.00 | 1.04 | 1.01 | 1.02 | 1.00 | 0.98 |
| Delta MH–ML (dN.m) | 70.78 | 77.04 | 84.49 | 94.06 | 101.60 | 108.40 |
| ts 1 (min) | 0.91 | 0.87 | 0.88 | 0.86 | 0.86 | 0.84 |
| t' 10 (min) | 1.98 | 1.95 | 1.99 | 1.96 | 1.96 | 1.94 |
| t' 50 (min) | 5.76 | 5.74 | 5.77 | 5.76 | 5.77 | 5.73 |
| t' 90 (min) | 25.21 | 25.06 | 24.82 | 25.01 | 24.79 | 24.38 |
| Delta t'50–t'10 (min) | 3.78 | 3.79 | 3.78 | 3.8 | 3.81 | 3.79 |
| STRESS STRAIN (DUMBELLS) Cure: 40' @ 160° C. | | | | | | |
| Stress @ 25 (MPa) | 2.1 | 2.6 | 2.7 | 3.0 | 3.2 | 3.6 |
| Stress @ 50 (MPa) | 3.6 | 4.3 | 4.6 | 5.2 | 5.6 | 6.5 |
| Stress @ 100 (MPa) | 7.3 | 8.5 | 9.3 | 10.4 | 11.4 | 13 |
| Stress @ 200 (MPa) | 18.3 | — | 23.9 | 25.6 | — | — |
| Stress @ 300 (MPa) | — | — | — | — | — | — |
| Tensile (MPa) | 25.1 | 21.3 | 28.7 | 27.4 | 25.8 | 24.8 |
| Elongation (%) | 260 | 195 | 220 | 210 | 190 | 160 |
| Hardness (° A) | 73 | 74 | 76 | 76 | 78 | 78 |
| DIN ABRASION Cure: 40' @ 160° C. | | | | | | |
| Specific Gravity: 1.08 Abrasion Volume Loss ($mm^3$) | 74 | 72 | 73 | 73 | 70 | 77 |
| TABER ABRASION Cure: 40' @ 160° C. Calibrate Wheel: K18 Number of Cycles: 1000 Specific Gravity: 1.08 | | | | | | |
| Abrasion Volume Loss (ml/kc) | 0.0287 | 0.0609 | 0.062 | 0.0567 | 0.0467 | 0.0538 |

TABLE 5

| FINAL MIX FORMULATION | | | 282 | 283 | 284 | 285 | 286 | 287 | 288 |
|---|---|---|---|---|---|---|---|---|---|
| | Plasticizer | | None | ESBO | ESBO | TOTM | TOTM | G31 | G31 |
| | Level | | 0 | 10 | 5 | 10 | 5 | 10 | |
| 275 | None | 1A | 90 | | | | | | |
| 276 | ESBO 5 | 1A | | 95 | | | | | |
| 277 | ESBO 10 | 1A | | | 100 | | | | |
| 278 | TOTM 5 | 1A | | | | 95 | | | |
| 279 | TOTM 10 | 1A | | | | | 100 | | |
| 280 | G31 5 | 1A | | | | | | 95 | |
| 281 | G31 10 | 1A | | | | | | | 100 |
| THERBAN C3467 | | 1A | 50 | 50 | 50 | 50 | 50 | 50 | 50 |
| VULCUP 40KE | | 1B | 6 | 6 | 6 | 6 | 6 | 6 | 6 |
| Specific Gravity | | | 1.085 | 1.082 | 1.079 | 1.082 | 1.078 | 1.086 | 1.085 |

MIXER: 6×12 inch Mill (Capacity: 1000 g)
Set Mokon @ 30° C.
Mixing Instructions
0'—band rubbers and preliminary rubber mix (“1A”) make ¾ cuts.
4'—add curative “1B”; make ¾ cuts
7'—remove and refine (6 passes)

| PRELIMINARY RUBBER MIX | | 275 | 276 | 277 | 278 | 279 | 280 | 281 |
|---|---|---|---|---|---|---|---|---|
| THERBAN C3467 | 1A | 100 | 100 | 100 | 100 | 100 | 100 | 100 |
| PARAPLEX G-31 | 1B | | | | | | 10 | 20 |
| PARAPLEX G-62 | 1B | 0 | 10 | 20 | | | | |
| PLASTHALL TOTM | 1B | | | | 10 | 20 | | |
| SARTOMER 633 (SR633) | 1B | 80 | 80 | 80 | 80 | 80 | 80 | 80 |
| Specific Gravity | | 1.155 | 1.145 | 1.137 | 1.145 | 1.136 | 1.152 | 1.149 |

MIXER: BR-82 Banbury (Capacity: 1602 cc)
55 RPM: Mokon @ 40° C.; 30 psi
Mixing Instructions
0"—add rubber “1A”
60"—add ½ of “1B”
120"—add ½ of “1B”
240"—sweep
360"—dump

TABLE 6

| | 282 | 283 | 284 | 285 | 286 | 287 | 288 |
|---|---|---|---|---|---|---|---|
| Plasticizer | None | ESBO | ESBO | TOTM | TOTM | G31 | G31 |
| Level | 0 | 5 | 10 | 5 | 10 | 5 | 10 |
| PRELIMINARY RUBBER MIX MOONEY VISCOSITY | | | | | | | |
| ML 1 + 4' @ 100° C. (mu) | 39.5 | 29.7 | 21.0 | 29.3 | 20.8 | 32.1 | 25.9 |
| COMPOUND MOONEY VISCOSITY | | | | | | | |
| ML 1 + 4' @ 100° C. (mu) | 43 | 36.9 | 30.1 | 37.2 | 32 | 38.8 | 35.4 |
| COMPOUND MOONEY SCORCH Large Rotor | | | | | | | |
| t5 @ 135° C. (min) | 24.2 | 13.0 | 11.7 | 17.9 | 18.8 | 21.1 | 25.7 |

TABLE 6-continued

| | 282 | 283 | 284 | 285 | 286 | 287 | 288 |
|---|---|---|---|---|---|---|---|
| MDR CURE CHARACTERISTICS<br>Frequency: 1.7 Hz<br>1° arc, 160° C., 60' motor | | | | | | | |
| MH (dN.m) | 88.78 | 85.76 | 87.64 | 76.79 | 67.21 | 79.1 | 73.83 |
| ML (dN.m) | 1.09 | 1.03 | 0.89 | 1.04 | 0.87 | 0.99 | 0.88 |
| MH–ML (dN.m) | 87.69 | 84.73 | 86.75 | 75.75 | 66.34 | 78.11 | 72.95 |
| ts 1 (min) | 1.55 | 0.87 | 0.83 | 1.11 | 1.15 | 1.27 | 1.53 |
| t' 10 (min) | 2.51 | 1.77 | 1.67 | 2.12 | 2.08 | 2.26 | 2.43 |
| t' 50 (min) | 5.52 | 5.08 | 5.01 | 5.57 | 5.59 | 5.55 | 5.71 |
| t' 90 (min) | 21.76 | 23.21 | 23.01 | 23.26 | 23.36 | 22.69 | 22.61 |
| t' 50–t' 10 (min) | 3.01 | 3.31 | 3.34 | 3.45 | 3.51 | 3.29 | 3.28 |
| STRESS STRAIN (DUMBELLS)<br>Cured: 40' @ 160° C. | | | | | | | |
| Stress @ 25 (MPa) | 2.2 | 2.6 | 2.8 | 2.4 | 2.0 | 2.5 | 2.1 |
| Stress @ 50 (MPa) | 3.9 | 4.4 | 4.9 | 4.1 | 3.4 | 4.2 | 3.7 |
| Stress @ 100 (MPa) | 7.9 | 8.6 | 9.8 | 8.1 | 6.9 | 8.2 | 7.2 |
| Stress @ 200 (MPa) | 21.0 | 22.5 | 23.9 | 21.1 | 18.3 | 21.2 | 19.1 |
| Stress @ 300 (MPa) | | | | | | | |
| Tensile (MPa) | 30.0 | 28.7 | 31.2 | 26.8 | 26.1 | 26.2 | 30.0 |
| Elongation (%) | 245 | 225 | 240 | 230 | 250 | 220 | 260 |
| Hardness (° A) | 76 | 77 | 79 | 74 | 73 | 73 | 73 |
| COMPRESSION SET - METHOD B<br>Cured: 40' @ 160° C.<br>Deflection: 25%<br>Aged 70 h @ 100° C. | | | | | | | |
| Compression Set (%) | 31 | 32 | 38 | 32 | 33 | 34 | 34 |
| DIN ABRASION<br>Cured: 40'@ 160° C. | | | | | | | |
| Specific Gravity | 1.085 | 1.082 | 1.079 | 10.82 | 1.078 | 1.086 | 1.085 |
| Abrasion Volume Loss (mm$^3$) | 79 | 81 | 86 | 81 | 83 | 76 | 68 |

I claim:

1. A curable rubber composition comprising an acrylate or methacrylate metal salt, an elastomer curable with a peroxide initiator, and a plasticizer having one or more epoxide groups per molecule, wherein the plasticizer is selected from the group consisting of epoxidized esters, epoxidized fatty acids, and epoxidized alcohols.

2. The rubber composition of claim 1, wherein the plasticizer is an epoxidized vegetable oil.

3. The rubber composition of claim 1, wherein the plasticizer is epoxidized soybean oil.

4. The rubber composition of claim 1, wherein the plasticizer is present in an amount of from about 2 to about 20 phr.

5. The rubber composition of claim 1, wherein the acrylate or methacrylate metal salt is selected from the group consisting of zinc diacrylate, zinc dimethacrylate, and mixtures thereof.

6. At The rubber composition of claim 5, wherein the acrylate or methacrylate metal salt is zinc diacrylate.

7. The rubber composition of claim 1, wherein the acrylate or methacrylate metal salt is present in an amount of from about 10 to about 100 phr.

8. The rubber composition of claim 1, wherein the elastomer is selected from the group consisting of acrylonitrile-butadiene rubber (NBR), polybutadiene rubber, and mixtures thereof.

9. The rubber composition of claim 1, wherein the elastomer is hydrogenated acrylonitrile-butadiene rubber.

10. A curable rubber composition comprising an acrylate or methacrylate metal salt, an elastomer curable with a peroxide initiator, a plasticizer having one or more epoxide groups per molecule and (2,6-di-t-butyl-4-(dimethylamino) methyl)phenol.

11. The rubber composition of claim 10, wherein the (2,6-di-t-butyl4-(dimethyl-amino)methyl)phenol is present in an amount of about 1 to about 3 phr.

12. A rubber product comprising a curable rubber composition comprising an acrylate or methacrylate metal salt, an elastomer curable with said peroxide initiator, and a plasticizer having one or more epoxide groups per molecule, wherein said rubber product is a conveyor belt.

13. A rubber product according to claim 12, wherein said rubber product is a hard roll cover.

14. A rubber product according to claim 12, wherein said rubber product is a golf ball.

* * * * *